United States Patent [19]

Lang

[11] Patent Number: 5,234,292
[45] Date of Patent: Aug. 10, 1993

[54] PNEUMATIC TUBE CONVEYOR SYSTEM

[75] Inventor: Hartmut Lang, Plochingen, Fed. Rep. of Germany

[73] Assignee: Infotronic Vertriebsgesellschaft fuer Kommunikationssysteme mbH, Plochingen, Fed. Rep. of Germany

[21] Appl. No.: 761,640

[22] Filed: Sep. 18, 1991

[51] Int. Cl.⁵ .............. B65G 51/34; B65G 51/12; B65G 51/28; B65G 51/40
[52] U.S. Cl. ........................ 406/1; 406/4; 406/110; 406/112; 406/3
[58] Field of Search ...................... 406/1-4, 406/112, 110

[56] References Cited

U.S. PATENT DOCUMENTS

| 3,419,229 | 12/1968 | Crosby | 406/110 |
| 4,058,274 | 11/1977 | Hochradel et al. | 406/2 |
| 4,529,335 | 7/1985 | Hilbert et al. | 406/1 |

FOREIGN PATENT DOCUMENTS

| 1142793 | 1/1963 | Fed. Rep. of Germany | 406/1 |
| 2054759 | 5/1972 | Fed. Rep. of Germany | 406/4 |
| 2128781 | 3/1973 | Fed. Rep. of Germany | 406/4 |
| 2359120 | 5/1975 | Fed. Rep. of Germany | 406/1 |
| 2418900 | 11/1975 | Fed. Rep. of Germany | 406/110 |
| 2336326 | 8/1977 | France | 406/1 |
| 2638724 | 5/1990 | France | 406/4 |
| 106229 | 5/1988 | Japan | 406/3 |

Primary Examiner—David M. Mitchell
Assistant Examiner—James M. Kannofsky
Attorney, Agent, or Firm—Porter, Wright, Morris & Arthur

[57] ABSTRACT

A pneumatic tube conveyor system comprises a dispatching station (13) for dispatching conveying cases, a receiving/dispatching station (22) for receiving conveying cases, and an intermediate store (42). A tube system comprising a bidirectional line connects the dispatching station the receiving/dispatching stations and the intermediate store. The tube system is associated with a plurality of gates (21, 33, 40, 51, 54, 55, 57, 58). Control means serve for connecting the dispatching station to the receiving/dispatching station, the receiving station to the intermediate store, and the intermediate store to the dispatching station.

11 Claims, 3 Drawing Sheets

PNEUMATIC TUBE CONVEYOR SYSTEM

The present invention relates to a pneumatic tube conveyor system having a plurality of dispatching stations for dispatching conveying cases, a plurality of receiving stations for receiving the conveying cases, a tube system which connects the dispatching stations and the receiving stations and which comprises a plurality of gates, and control means for connecting any dispatching station selectively to any receiving station.

A pneumatic tube conveyor system of the described type is generally known.

Pneumatic tube conveyor systems are generally used for transporting lightweight articles. A typical application of pneumatic tube conveyor systems is the transportation of in-house mail within a factory plant, i.e., the transportation of papers between a plurality of stations which are at the same time dispatching stations and receiving stations. Further, pneumatic tube conveyor systems are employed in hospitals for distributing papers, but also small-size articles, such as medicines, within the hospital. Finally, another typical application of pneumatic tube conveyor systems is found in credit institutions where the counters, which are accessible to the public, are connected to the central money deposit by a pneumatic tube conveyor system so that large amounts of cash need not be kept at the very counters which are accessible to the public.

It is also known that systems for distributing articles and machine elements are required in industrial enterprises where assembly operations have to be performed, for example on special machines. Such machine elements include, on the one hand, large machine components that can be moved only by heavy implements, such as machine chassis or complete pre-assembled units, and on the other hand, at the other end of the dimensional scale, medium-sized and small parts such as screws, nuts, bolts, pins, seals, hoses, valves, and the like.

As has been mentioned before, with the known pneumatic tube conveyor systems all stations are normally operated as combined dispatching and receiving stations. This means that when a user of one such station has received a conveying case, he keeps the empty case temporarily in order to use it later when he himself wishes to send something to another station. In this connection, it is of course also possible to send empty conveying cases in the event these should have run out at a given station.

Generally speaking, this means that the system does not differentiate between the dispatch of filled conveying cases and the dispatch of empty conveying cases, but that the entire pneumatic tube conveyor system, with all its control arrangements, must be operated even when only empty conveying cases have to be returned. This means a restriction of the capacity of the conveying system as the transportation of empty conveying cases through the system requires the same amount of time as the transportation of filled conveying cases.

While it would be imaginable as an alternative to provide separate return channels for empty conveying cases, this would require considerable additional installation and cost.

Now, it is the object of the present invention to improve a pneumatic tube conveyor system of the type described above in such a way that empty conveying cases can be returned with the least possible consumption of time and cost.

The invention achieves this object by the fact that the pneumatic tube conveyor system is equipped with pneumatic tube conveyor means comprising a bidirectional pneumatic tube line, that a gate is arranged in the pneumatic tube line and that it is possible, by means of the gate, to connect alternatively either a dispatching station to a receiving station for the dispatch of conveying cases, or a receiving station to a dispatching station via a first intermediate store, for the return of conveying cases.

The invention solves the underlying object in this manner fully and perfectly because the dispatching station is fully relieved of the necessity of handling conveying cases travelling in a return direction opposite the dispatching direction. This is so because the returning conveying cases are separated out of the bidirectional line before reaching the dispatching station and are then guided to an intermediate store.

A particularly good effect is achieved in this case when the receiving stations are equipped with means for returning conveying cases and when the conveying cases are returned in groups of predetermined numbers (N).

This measure makes use in the first instance of the known feature that a receiving station can be designed to serve simultaneously as a dispatching station for returning empty conveying cases, hereinafter referred to as a receiving/dispatching station. But in contrast to conventional stations of this kind, this embodiment of the invention provides that the empty conveying cases to be returned are gathered to form convoys for being returned in groups of, for example, five empty conveying cases. This provides the advantage that for returning a group of several conveying cases, the tube system is utilized practically for the same period of time that heretofore has been required for returning a single case, which considerably improves the capacity utilization of the pneumatic tube conveyor system. Dispatching the conveying cases in groups is possible because the empty conveying cases to be returned all have to take the same way.

According to another preferred embodiment of the invention, the first intermediate store comprises a number of storage positions corresponding in size to the size of the predetermined number (N) of conveying cases.

This feature provides the advantage that the returned, empty conveying cases can be handled by groups. This enables the conveying cases to be dispatched from individual receiving/dispatching stations by groups, as required, and to be collected in the intermediate store from where they can then be supplied to the dispatching stations via pneumatic tube conveyor means, likewise in groups.

Further, it is particularly preferred if the first intermediate store is followed in the return direction by a plurality of gates by means of which the first intermediate store can be connected selectively to any dispatching station.

This feature provides the advantage that the dispatching stations can be supplied with empty conveying cases in the most flexible way because the cases can be routed from the intermediate store selectively to each dispatching station.

Further, it is preferred in connection with this embodiment of the invention, that the first intermediate store is followed in the return direction by a second intermediate store arranged above the dispatching station.

This feature provides the advantage that empty conveying cases can be buffered in the area of the dispatching stations so that uninterrupted work can be ensured. It has to be considered in this connection that, as has been mentioned before, extremely different cycle times can occur when dispatching filled conveying cases, and also when loading empty conveying cases at the receiving stations, the cycle times being determined in any case by the particularities of the particular order. It may, therefore, well happen, statistically, that absolutely no empty conveying case, or group of conveying cases, is returned to the materials distribution center, or on the other hand that a great number of conveying cases or groups of conveying cases are returned in rapid succession. In this latter case, both the first intermediate store and the second intermediate store serve as buffers which compensate for any such statistical variations.

Finally, the measure to provide the second intermediate store above the dispatching position provides the considerable advantage that the conveying cases or groups of conveying cases can drop from above into the area of the dispatching stations by the mere effect of gravity, without any need for additional mechanical conveying elements. Rather, as a rule, it will be absolutely sufficient to remove some mechanical locking means, for example a locking pin, from the path of the empty conveying cases in the second intermediate store in order to permit the conveying cases to drop into the area of the dispatching station.

Finally, another embodiment of the invention is preferred when the assembly shop is subdivided into a predetermined number of areas, wherein the number of bidirectional lines corresponds to that predetermined number of areas, each of such lines being assigned to one of the said areas.

This feature provides the advantage that the areas can be selected to have approximately identical demands for assembly parts, both factually and related to time, so that the utilization of each of the lines can be expected to be approximately equal, and this not only as regards the supply of assembly parts but also as regards the return of empty conveying cases. By linking the lines internally, it is then possible to implement multiplex operation for the dispatching and the returning function, so that on the one hand conveying cases can be sent from any dispatching station to any receiving/dispatching station via a first path and, on the other hand, empty conveying cases can be sent from any receiving/dispatching station back to any dispatching station via a second path.

Other advantages of the invention will appear from the specification and the attached drawing.

It is understood that the features that have been described before and will be explained hereafter may be used not only in the described combinations, but also in any other combination, or individually, without departing from the scope and intent of the present invention.

One embodiment of the invention will now be described in more detail with reference to the drawing in which.

Figure 1:
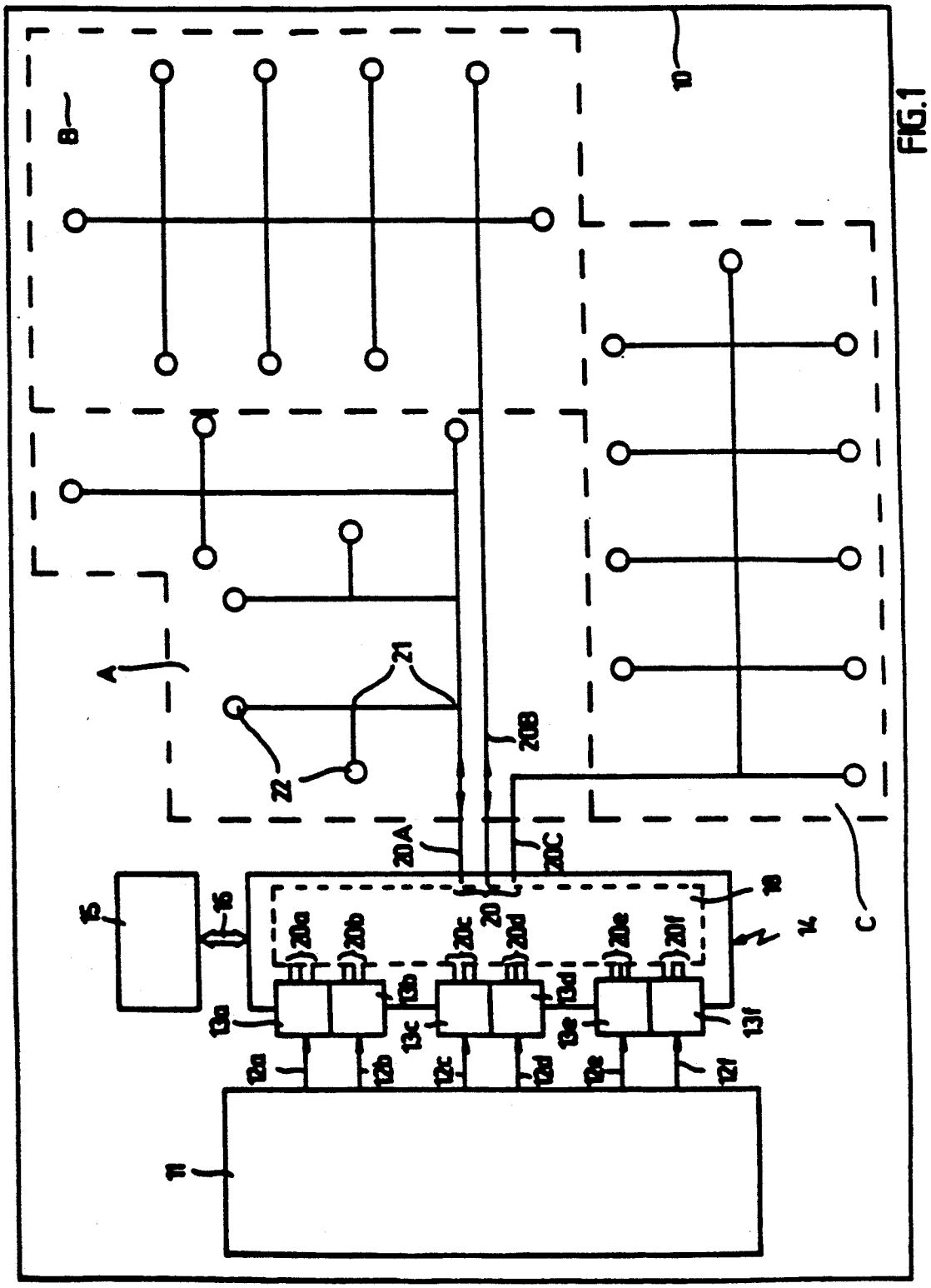
FIG. 1 shows a diagrammatic block diagram of an assembly shop equipped with a pneumatic tube conveyor system according to the invention.

In FIG. 1, the pneumatic tube conveyor station is located within an assembly shop 10 of the type used, for example, in a manufacturing plant for assembling special machines. Assembly shops of this kind include a plurality of assembly work places or positions where complete machines are assembled by fitters from parts supplied to these positions. As regards the parts required for this purpose, one usually distinguishes between different dimensional classes, the heaviest parts, for example machine frames or completely pre-assembled units, being distributed in the assembly shop 10 by means of cranes or trolleys, while a distribution system using electric trolleys or fork trucks is used for parts of medium weight.

The present invention deals with a distribution system for small mechanical components or parts, such as screws, nuts, pins, bolts or other parts having weights of up to approximately 15 kg, either individually or grouped by orders.

In the case of FIG. 1, the described parts are kept ready for use in the conventional manner in a parts store 11 in the assembly shop 10. Conveyor systems 12a to 12f provide the possibility to call off the parts individually or by orders from the parts store 11. This is done by workers working at order picking positions 13 where individual orders of parts required at the assembly positions in the assembly shop 10 are prepared for dispatch from the parts arriving from the parts store 11.

In the case of the present invention, the order picking positions 13 are designed as dispatching stations of a pneumatic tube conveyor system. Consequently, the order picking positions 13 are part of a materials distribution center 14 which serves to supply the assembly positions in the assembly shop 10 with parts of the before-mentioned weight range.

The pneumatic tube conveyor system is connected, via a data line 16, to control means designed as a computer 15 which serves first to ensure that the required parts are supplied from the parts store 11. The computer also provides, in the manner that will be described in more detail below, a connection between one of the dispatching stations 13a to 13f and one of the receiving/dispatching stations 22.

The assembly shop 10 is subdivided into a predetermined number of areas, the number and location of the areas being selected in such a way that each area has approximately the same demand for parts, by number and/or volume. In the case of the illustrated example, the assembly shop 10 is subdivided into three areas A, B and C.

One end of a conveyor tube system 18 communicates with a plurality of lines 20, the number of these lines corresponding to the number of areas. In the case of the example illustrated in FIG. 1, therefore, three lines 20A, 20B and 20C are provided, which are assigned to the areas A, B and C, respectively.

As illustrated by way of example for the area A in FIG. 1, the line 20A leads to a first gate or plurality of gates 21 so that the line can be connected to one of a number of the receiving/dispatching stations 22. By operating the gates 21 in a suitable manner over a plurality of operational positions, it is thus possible, by means of the computer 15, to connect the lines 20A, 20B, 20C to the receiving/dispatching stations 22, each such receiving/dispatching station 22 being assigned to an assembly position in the assembly shop 10.

Now, it is one of the functions of the pneumatic tube conveyor system to connect each dispatching station 13a to 13f selectively to any receiving/dispatching station 22 in any area A, B or C, in order to transport conveying cases filled with parts from the dispatching stations 13a to 13f to the receiving/dispatching stations 22. Another function consists, however, in dispatching and returning the empty conveying cases from the receiving/dispatching stations 22 to the dispatching stations 13a to 13f so that they can be filled and dispatched again.

In order to ensure that these functions can be properly performed, certain arrangements are made in the pneumatic tube conveyor system which will be discussed in detail below.

Considering that the flow of parts in an assembly shop 10 can neither be predicted nor pre-sorted at reasonable expense, it is provided in the case of the pneumatic tube conveyor system according to the invention that each of the dispatching stations 13a to 13f can route cases to any receiving/dispatching station 22 in any area A to C.

Figure 2:
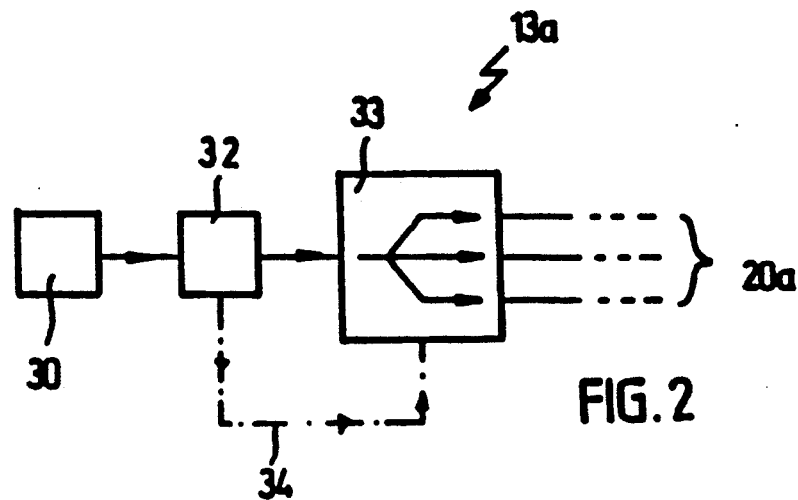
FIG. 2 shows a detail of FIG. 1 illustrating a dispatching station.

FIG. 2 shows in this connection an installation within, e.g., dispatching station 13a.

Starting from a loading position 30, a conveying case passes at first a reading position 32 where destination coordinates of the conveying case appearing on a label are read by a suitable scanner. Signals so scanned are converted into a control command which is supplied, via a control line 34, to a second gate 33 located downstream of the reading position 32.

The second gate 33, operating over a plurality of operational positions in response to control commands supplied via the control line 34, connects any of the dispatching stations selectively to any of as many outlet tube sections 20a to 20f as lines 20 are provided in the pneumatic tube conveyor system. In the illustrated example, the gate 33 connects with three outlet tube sections 20a, each of which communicates via the conveyor tube system 18 with one of the lines 20A to 20C.

It has already been mentioned before that it is another function of the pneumatic tube conveyor system to return empty conveying gases from the receiving/dispatching stations 22 to the dispatching stations 13.

Figure 3:
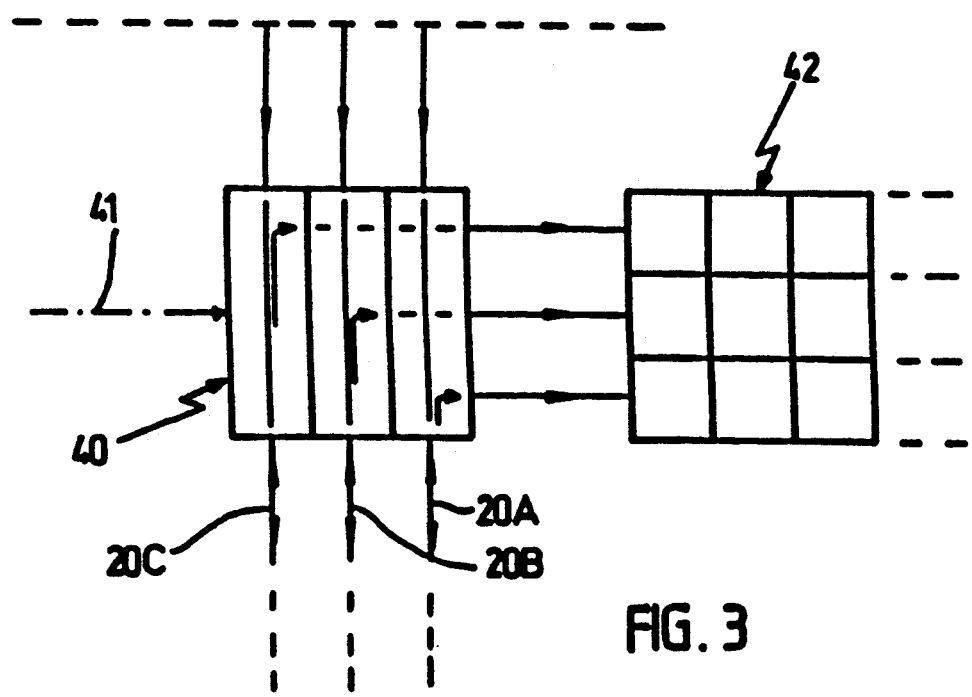
FIG. 3 shows another detail of FIG. 1 illustrating an intermediate store for empty conveying cases.

To this end, the lines 20A to 20C are designed as bidirectional lines, as indicated by the double arrows in FIGS. 1 and 3.

FIG. 3 shows a third gate 40 in the lines 20A to 20C, which enables returning empty conveying cases, in response to control commands supplied via a control line 41, to be directed from the lines 20A to 20C to a first intermediate store 42.

It goes without saying that this procedure can be employed not only for empty conveying cases returning regularly, but also for any stray cases which, due to some malfunction of the pneumatic tube conveyor system, have not reached their destination receiving/dispatching station 22 and have to be returned to the materials distribution center 14 in order to prevent trouble.

Figure 4:
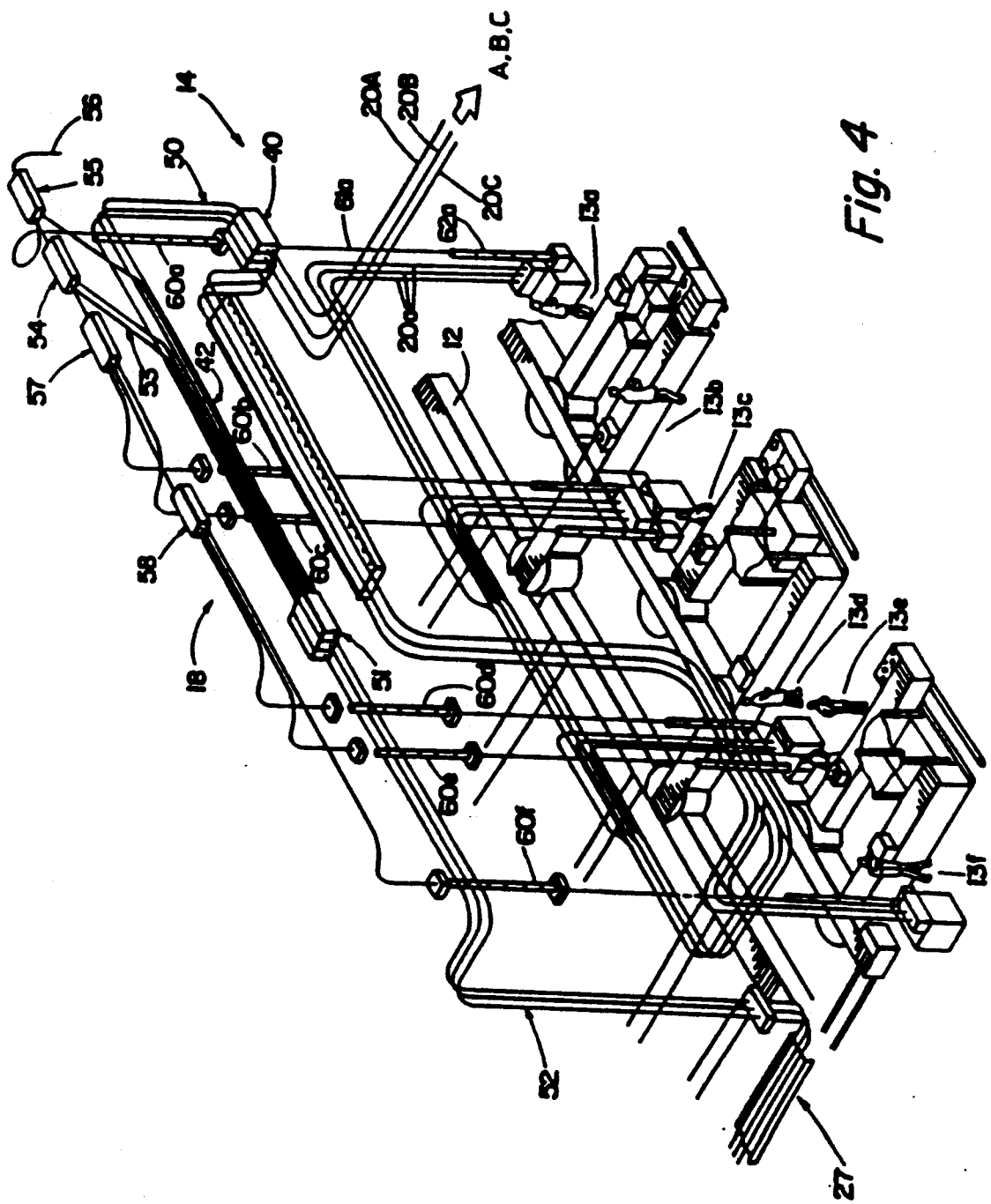
FIG. 4 shows a perspective view of the dispatching stations and intermediate stores for empty conveying cases of a pneumatic tube conveyor system according to the invention.

The way in which returning conveying cases are handled further is illustrated in FIG. 4.

FIG. 4 shows that each conveying case being dispatched from a dispatching station is diverted by the gate 40 by 180°, and is then directed to the area for which it is intended, via the lines 20A to 20C. On the other hand, conveying cases returning through the lines 20A to 20C pass the gate 40 straight ahead and are guided initially into a first tube section 50 leading in an upward direction and then into a long horizontal track which is located above the intermediate store and which simultaneously constitutes the first intermediate store 42. Thus gate 40 affords in a first operational position direct pneumatic tube access from a dispatching station to a receiving/dispatching station and in a second operational position pneumatic tube access from a receiving/dispatching station to a dispatching station via an intermediate store.

At the end of the first intermediate store 42, a fourth gate 51 is provided which is switched in such a way that once the returning conveying cases have passed the first intermediate store 42, they can pass the gate straight ahead and can be guided, via a second tube section 52, in a downward direction and to a buffer store 27 which serves as a waiting position for conveying cases that cannot be dispatched and at the same time as a harbor for stray cases.

If, in contrast, the cases to be handled are empty conveying cases which are to be supplied via the first tube section 50 and to be distributed to the dispatching stations 13a to 13f, then the cases will be diverted in the gate 51 by 180° and returned via a third tube section 53 extending in parallel to the first intermediate store 42.

A plurality of gates, designed as gates 54, 55, 57 and 58, is arranged between gate 51 and the dispatching stations. The third tube section 53 leads from gate 51 to gates 54 and 55, which can be run through straight ahead, and thereafter to a fourth tube section 56 which is closed at its end. Following a change in direction, the returning empty conveying cases, arriving through the fourth tube section 56, are allowed again to pass the gates 54, 55 and, also the subsequent gates 57 and 58, provided the plurality of operational positions of the plurality of gates has been set properly, the gates 54, 55, 57 and 58 providing the possibility to route the cases selectively to second intermediate stores 60a to 60f. Thus gate 51 affords in a first operational position pneumatic tube access from the first intermediate store 42 to the plurality of gates and in a second operational position pneumatic tube access from the first intermediate store to the buffer store, and the plurality of gates connects the gate 51 in its first operational position with any of the dispatching stations. The second intermediate stores 60a to 60f are each assigned to one of the dispatching stations 13a to 13f. The second intermediate stores 60a to 60f are located above the dispatching positions 13a to 13f so that the empty conveying cases can drop into third intermediate stores 62a to 62f, through down tubes 61a to 61f under the effect of gravity.

Returning and distributing empty conveying cases is preferably effected in such a way that the fitters at the assembly positions load the empty conveying cases into the receiving/dispatching 22, the receiving/dispatching stations 22 being so designed that empty conveying cases are always returned in groups of a predetermined number (N), for example in groups of five. Each group of five empty conveying cases is then conveyed, in the manner just described, through the first tube section 50 adjacent the gate 40, and is distributed, also in groups, by means of the gates 54, 55, 57 and 58. Consequently, the second intermediate stores 60a to 60f are also filled with groups of empty conveying cases, e.g., five cases at a time, and each group of five cases is then positioned to drop through the down tube 61 by gravity and into the third intermediate store 62.

Now, when the operator at one of the dispatching stations 13a to 13f has worked off his supply of five empty conveying cases in the third intermediate store 62a to 62f the next group of five cases may be caused at the same moment slide down from the second intermediate store 60a to 60f, through the drop tube 61, so that he can continue to work without any interruption. The computer 15 ensures in this connection that the three parallel tracks of the first intermediate store 42 are filled with groups of five cases as uniformly as possible so that when needed a group of five cases can be supplied to one of the second intermediate stores 60a to 60f from any of the three tracks of the first intermediate store 42, the network of the tube sections 53 and 56 and the gates 54, 55, 57 and 58 enabling the necessary selective connections.

Of course, a group of empty conveying cases can be caused to be supplied when a group of five cases in any of the third intermediate stores 62a to 62f has been worked off partially, as determined in advance, so as to ensure that the new group of five cases is available as soon as the preceding group of five cases has been worked off completely.

In the case of one practical example of a pneumatic tube conveyor system, an assembly shop which has a length of 560 m and which is subdivided into three areas, is supplied with a total of approximately 2300 dispatched cases during 15 hours, with a reserve of 30%. The conveying cases may have a total weight of up to 7 kg. The forwarding tube has a nominal width of 160 mm, so that a loading diameter of 110 mm and a loading length of 400 mm is obtained for the conveying cases. The conveying cases travel at a speed of approximately 6 m/s.

I claim:

1. A pneumatic tube conveyor system for transporting conveying cases, comprising:
   a pneumatic tube dispatching station;
   a pneumatic tube receiving/dispatching station;
   first pneumatic tube conveyor means arranged between said pneumatic tube dispatching station and said pneumatic tube receiving/dispatching station;
   a first gate associated with said first pneumatic tube conveyor means;
   second pneumatic tube conveyor means arranged between said first gate and said pneumatic tube dispatching station, said second pneumatic tube conveyor means comprising a first intermediate store; and
   control means for selecting an operational position of said first gate, said first gate comprising a first operational position for affording direct pneumatic tube access from said pneumatic tube dispatching station to said pneumatic tube receiving/dispatching station and a second operational position for affording pneumatic tube access from said pneumatic tube receiving/dispatching station to said pneumatic tube dispatching station via said first intermediate store.

2. The system of claim 1 wherein said pneumatic tube dispatching station further comprises a second intermediate store arranged above said pneumatic tube dispatching station, said second intermediate store communicating with said second pneumatic tube conveyor means.

3. The system of claim 1 wherein said first pneumatic tube conveyor means comprises a bidirectional pneumatic tube line.

4. The system of claim 1, further comprising:
   at least one other pneumatic tube dispatching station; and
   a second gate arranged between said pneumatic tube dispatching stations and first pneumatic tube conveyor means, said second gate comprising a plurality of operational positions for connecting any of said pneumatic tube dispatching stations to said first pneumatic tube conveyor means, said control means further comprising means for selecting one of said plurality of operational positions of said second gate.

5. The system of claim 1, further comprising:
   at least one other pneumatic tube receiving/dispatching station;
   a second gate arranged between said pneumatic tube receiving/dispatching stations and said first pneumatic tube conveyor means, said second gate comprising a plurality of operational positions for connecting any of said pneumatic tube receiving/dispatching stations to said first pneumatic tube conveyor means; said control means further comprising means for selecting one of said plurality of operational positions of said second gate.

6. The system of claim 1 wherein said pneumatic tube receiving/dispatching station comprises means for dispatching as a group a predetermined number (N) of said conveying cases.

7. The system of claim 6 wherein said first intermediate store comprises a storage position corresponding in size to the size of said group of said predetermined number (N) of conveying cases.

8. The system of claim 1, further comprising:
   at least one other pneumatic tube dispatching station; and
   a plurality of gates arranged between said first intermediate store and said pneumatic tube dispatching stations, said plurality of gates comprising a plurality of operational positions for connecting said first intermediate store to any of said pneumatic tube dispatching stations, said control means further comprising means for selecting one of said plurality of operational positions of said plurality of gates.

9. The system of claim 8, further comprising:
   a second gate arranged between said first intermediate store and said plurality of gates; and
   a buffer store communicating with said second gate, said second gate comprising a first operational position for affording pneumatic tube access from said first intermediate store to said plurality of gates and a second operational position for affording pneumatic tube access from said first intermediate store to said buffer store.

10. The system of claim 1, further comprising:
    a second gate arranged between said first intermediate store and said pneumatic tube dispatching station; and
    a buffer store communicating with said second gate, said second gate comprising a first operational position for affording pneumatic tube access from said first intermediate store to said pneumatic tube dispatching station and a second operational position for affording pneumatic tube access from said first intermediate store to said buffer store, said control means further comprising means for selecting an operational position of said second gate.

11. The system of claim 10, further comprising:
at least one other pneumatic tube dispatching station; and
a plurality of gates arranged between said pneumatic tube dispatching stations and said second gate, said plurality of gates comprising a plurality of operational positions for connecting said second gate to any of said pneumatic tube dispatching stations, said control means further comprising means for selecting one of said plurality of operational positions of said plurality of gates.

* * * * *